United States Patent
Siebert et al.

(10) Patent No.: US 10,560,442 B2
(45) Date of Patent: Feb. 11, 2020

(54) PARTICIPATION THRESHOLDING FOR EXTENDING COMMUNICATION SECURITY FUNCTIONALITY

(71) Applicant: TargetProof, LLC, Atlanta, GA (US)

(72) Inventors: Steven M. Siebert, Augusta, GA (US); Gregory G. Rose, San Diego, CA (US); Thomas M. Stone, Marietta, GA (US); Andrew C. Schenkel, Devon, PA (US)

(73) Assignee: TargetProof, LLC, Atlanta, GA (US)

( * ) Notice: Subject to any disclaimer, the term of this patent is extended or adjusted under 35 U.S.C. 154(b) by 0 days.

(21) Appl. No.: 14/745,450

(22) Filed: Jun. 21, 2015

(65) Prior Publication Data

US 2015/0373002 A1    Dec. 24, 2015

Related U.S. Application Data

(60) Provisional application No. 62/015,517, filed on Jun. 22, 2014.

(51) Int. Cl.
*H04L 29/06* (2006.01)
*H04L 12/58* (2006.01)
*G06Q 10/10* (2012.01)

(52) U.S. Cl.
CPC .......... *H04L 63/08* (2013.01); *G06Q 10/107* (2013.01); *H04L 51/046* (2013.01); *H04L 63/105* (2013.01); *H04L 63/1408* (2013.01); *H04L 63/1466* (2013.01); *H04L 51/00* (2013.01)

(58) Field of Classification Search
None
See application file for complete search history.

(56) References Cited

U.S. PATENT DOCUMENTS

| | | | |
|---|---|---|---|
| 9,268,026 B2* | 2/2016 | Shin | G01S 19/47 |
| 2004/0169722 A1* | 9/2004 | Pena | G07F 17/16 |
| | | | 348/14.01 |
| 2012/0046063 A1* | 2/2012 | Chande | H04W 52/143 |
| | | | 455/522 |
| 2013/0305357 A1* | 11/2013 | Ayyagari | H04L 63/14 |
| | | | 726/22 |
| 2013/0318589 A1* | 11/2013 | Ford | H04L 63/08 |
| | | | 726/7 |

\* cited by examiner

*Primary Examiner* — Joseph P Hirl
*Assistant Examiner* — Leynna Truvan
(74) *Attorney, Agent, or Firm* — Long Technology Law, LLC; Joseph L. Long

(57) ABSTRACT

Systems and methods can support change management thresholds within human machine interfaces. An operation or feature may be introduced into a multi-user information system where a benefit is conveyed to specific benefited instances of events. A user indication associated with the specific benefited instances may be initially disabled. A quantity of the specific benefited instances may be calculated or counted. The calculated quantity may be compared to a threshold quantity. The user indication associated with the specific benefited instances may be enabled in response to the comparison indicating that the threshold has been exceeded. The user indication may be presented via a user interface mechanism associated with the multi-user information system. According to certain examples, sender authentication may be added to an email system such that instances of authentication are not displayed until a certain number or percentage of messages is being authenticated.

18 Claims, 5 Drawing Sheets

PARTICIPATION THRESHOLDING FOR EXTENDING COMMUNICATION SECURITY FUNCTIONALITY

RELATED APPLICATION

This application claims priority to U.S. Provisional Patent Application No. 62/015,517, filed Jun. 22, 2014 and entitled "Participation Thresholding for Extending Communication Security Functionality." The complete disclosure of the above-identified priority application is hereby fully incorporated herein by reference.

BACKGROUND

Certain technological systems or services are intended to leverage a large number of participants. When such systems do not reach their full potential until there are sufficient participants, they may be said to demonstrate the "network effect" or "network externalities." The network effect implies that the value of a product or service depends upon the number of users employing the technology. A historic example was the facsimile (fax) machine. The more users who adopted the fax machine, the more useful or valuable a fax machine became to each user.

As with the fax machine example, many communication systems and features thereof exhibit the network effect. Extending features of a communication modality may also require wide adoption to realize its usefulness. For example, the technology to extend electronic mail to allow attaching files depended upon most or all email clients adopting the technology before its use could become common practice and thus truly beneficial to users. The transition from not having a technological feature to enough users having the technological feature to become commonly useful can be complicated by many factors.

There is a need in the art for change management mechanisms supporting the phasing-in of technological features when these features exhibit the network effect and thus depend upon wide adoption before becoming useful, valuable, or even meaningful to users. There is further need for these change management mechanisms to support extending or improving existing systems or services by phasing in new technological features.

SUMMARY

In certain exemplary embodiments described herein, methods and systems can support change management thresholds within human machine interfaces. An operation or feature may be introduced into a multi-user information system where a benefit is conveyed to specific benefited instances of events. A user indication associated with the specific benefited instances may be initially disabled. A quantity of the specific benefited instances may be calculated or counted. The calculated quantity may be compared to a threshold quantity. The user indication associated with the specific benefited instances may be enabled in response to the comparison indicating that the threshold has been exceeded. The user indication may be presented via a user interface mechanism associated with the multi-user information system. According to certain examples, sender authentication may be added to an email system such that instances of authentication are not displayed until a certain number or percentage of messages is being authenticated.

These and other aspects, objects, features, and advantages of the example embodiments will become apparent to those having ordinary skill in the art upon consideration of the following detailed description of illustrated exemplary embodiments.

DETAILED DESCRIPTION OF EXAMPLE EMBODIMENTS

Overview

Figure 1:
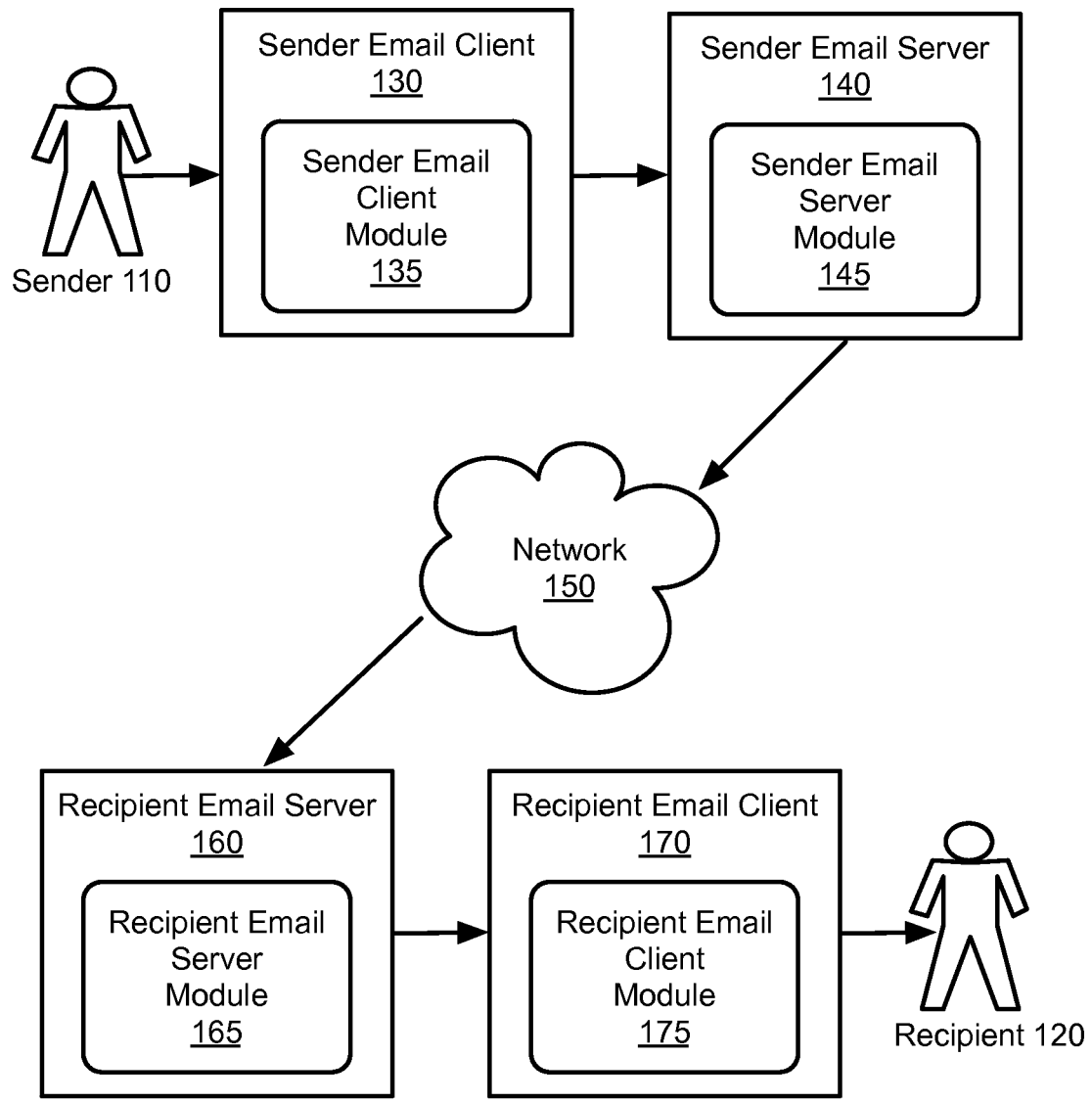
FIG. 1 is a block diagram depicting an email security system with participation thresholding in accordance with one or more embodiments presented herein.

The methods and systems described herein enable participation thresholding technology as a change management mechanism for improving, extending, or adding features to existing multi-user information systems. While the participation thresholding technology presented herein may be applied to the context of any multi-user information system, examples are presented herein for application to electronic mail (email) systems. More specifically, various examples and embodiments presented herein illustrate application of participation thresholding technology to email security.

An example extended email feature can indicate which received emails have been authenticated and which have not. Introducing this feature into an enterprise may occur over a period of time. Despite the best wishes of information technology professionals, adoption may not happen instantaneously. Even within a single enterprise, there may be users on vacation, on business trips, or simply reluctant to accept updates. Also, updates may be intentionally staged, for example to a test population first, then executives (since they are often targets of "phishing" attacks), then everyone else.

From the initial deployment, email users may already have the entire functionality of the system. For example, all outgoing emails may be signed using the proper user credentials. This may prevent active tampering. Also, received mail may be evaluated for authentication or reliability of the sender. However, the results of the evaluation may be hidden from the user (or simply not displayed) to avoid frustrating or confusing the user when many of their received emails cannot be authenticated.

Display of a reliability indicator (such as authentication status indicator) for a received email may be suppressed until a threshold of use or adoption is exceeded. The example email system may be configured to not make recommendations (as to reliability or authentication) until the adoption of the system is widespread enough to make the recommendations on the whole somewhat reliable. This is merely one example of how certain features may become automatically available based on this threshold of adoption.

The participation thresholding technology described herein may also be applicable to other multi-user applications, such as a crowd-sourced information system which may not show an additional dimension of crowd-sourced information until there is sufficient quantity, in whatever context, to be meaningful. A sufficient quantity of crowd-sourced information may allow the avoidance of confusion or the appearance of incompleteness. For example, a traffic-related crowd-sourced mobile application may be enhanced with participation thresholding technology to avoid redirecting motorists when only a single motorist is stopped due to a blown tire but all other users are not impacted by this event. Participation thresholding technology may also enhance a GPS/route mapping system which collects traffic-related crowd-sourced information by requiring a minimum number of users following a certain route before displaying any traffic information on that mapped route, except perhaps when a dangerous hazard or otherwise important information must be communicated to users.

The functionality of various example embodiments will be explained in more detail in the following description to be read in conjunction with the figures illustrating the process flow. Turning now to the drawings, in which like numerals indicate like (but not necessarily identical) elements throughout the figures, exemplary embodiments are described in detail.

Example System Architectures

FIG. 1 is a block diagram depicting an email security system 100 with participation thresholding according to one or more exemplary embodiments of the technology presented herein. A sender 110 can access a sender email client 130 to enter and transmit an email message. The sender email client 130 may include a sender email client module 135. The sender email client 130 may transmit the email message to a sender email server 140. The sender email server 140 may include a sender email server module 145. The sender email server 140 may transmit the email message via a network 150 to a recipient email server 160. The recipient email server 160 may include a recipient email server module 165. A recipient 120 may access a recipient email client 170 operable to obtain the email message from the recipient email server 160. The recipient email client 170 may include a recipient email client module 175.

It should be appreciated that the sender email client 130 and the sender email server 140 may be the same system, two systems, or multiple systems depending upon various embodiments. Similarly, the recipient email client 170 and the recipient email server 160 may be the same system, two systems, or multiple systems depending upon various embodiments. While a unidirectional system is illustrated for the sake of simplicity, it should also be appreciated that in practice the sender 110 can also receive email message and the recipient 120 can also send emails. In practice there may be many email users who may each be a sender 110 and a recipient 120.

Figure 5:
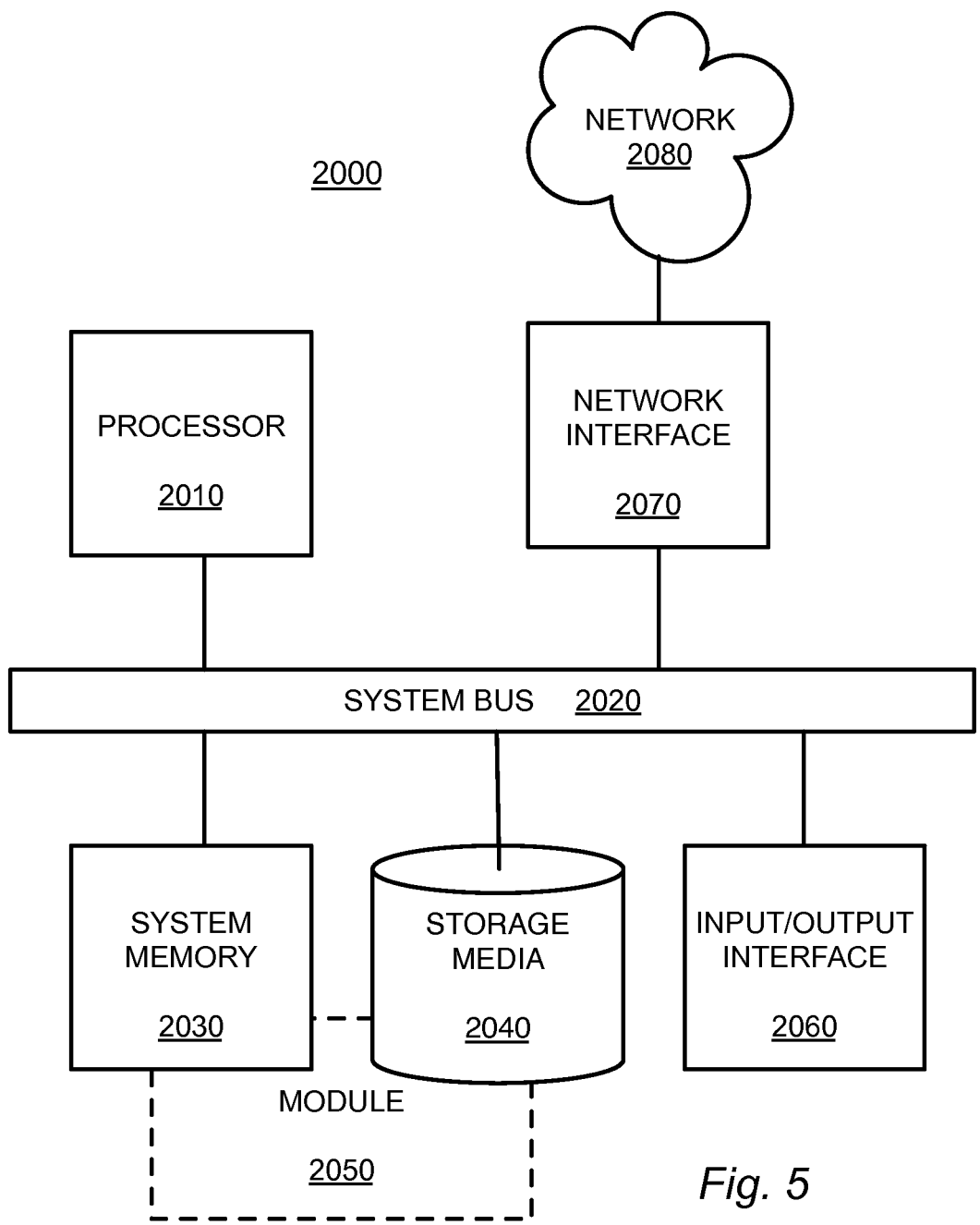
FIG. 5 is a block diagram depicting a computing machine and a module in accordance with one or more embodiments presented herein.

The sender email client 130, the sender email server 140, the recipient email server 160, the recipient email client 170, and any other computing machines associated with this technology may each be any type of computing machine such as, but not limited to, those discussed in more detail with respect to FIG. 5. Furthermore, the sender email client module 135, the sender email server module 145, the recipient email server module 165, the recipient email client module 175, and any modules associated with any of these computing machines or any other modules (scripts, web content, software, firmware, or hardware) associated with the technology presented herein may each be any of the modules discussed in more detail with respect to FIG. 5. The computing machines discussed herein may communicate with one another as well as other computer machines or communication systems over one or more networks such as network 150. The network 150 may include any type of data or communications network including any of the network technology discussed with respect to FIG. 5.

The example system 100 can attest to the authenticity of users as the senders of electronic mail by showing the email recipient an indication of whether a particular email did or could not have come from the purported sender. Also, some level of confidence in the authenticity of the sender may be specified. Upon first use of the system 100, a user who does not already have public/secret key pairs and/or certificates ("credentials") may be provided with these.

This system 100 may be deployed initially within organizations such as government departments or medium to large corporations, many of whom are subjected to targeted spoofed email attacks ("phishing", particularly "spear phishing" when the email appears to be specific to individual senders and recipients). The system 100 may also extend to any users and to systems other than email.

Techniques for authenticating the origin of an email may include cryptographic digital signatures over the contents of the email, or public key cryptographic tools (such as S/MIME or PGP). For example, the body of an email message may be augmented with a digital signature calculated using a secret key known only to the real sender. Since users generally are not required to remember actual keys, the secret key may be stored on a device belonging to the sender that can be unlocked for use by a PIN or password, a hardware token, a biometric characteristic of the user, or some combination thereof. Upon receipt of the email, the recipient can use the corresponding public key of the sender to verify that the contents are unaltered and came from the purported sender. In a phishing attack, the forger will not have access to the purported sender's secret key, and so will not be able to create a valid digital signature on the email, even if the forger is capable of making it appear that the email came from the purported sender.

When using digital signatures for email authentication, the recipient generally needs to already have access to the sender's public key to perform verification. This may be assisted by the existence of a Public Key Infrastructure (PKI), in which a hierarchy or web of trust of other participants attest to the association between a user's email address and their public key. An example of hierarchy attestation may be seen in S/MIME mechanisms, while an example of web of trust attestation may be seen in Pretty Good Privacy (PGP) mechanisms. Attestation may be in the form of another digital signature from the attester upon some structured data that includes (among other things) the email address and public key of the subject user. This may be referred to as a certificate. Verification of the identity may thus proceed at least according to the following two examples.

According to the first example, hierarchical attestations may be leveraged wherein the original signature (in the email) is accompanied by a chain of certificates. The chain leads to an attester whose public key is implicitly known. This knowledge may come, for example, from being incorporated into the software system being used (such as web browser, email client, or operating system).

According to the second example, web of trust verifications may leverage a local database of public keys and/or a searchable database accessible over the network. The external database might be organizationally based, or completely public. The validity of the public key (and hence the email) is based on some sort of preponderance of evidence by multiple attesters. The certificate(s) in this case are often embedded in the large blob of data that may be referred to as "the public key."

Widespread adoption of identity verification for email authentication may be complicated by various implementation challenges. For example, keys and certificates are generally nontrivial to obtain and manipulate. Accordingly, the email authentication solution may benefit significantly from participation thresholding. Even if users have the entire authentication functionality at the time of initial deployment, displaying results of the authentication evaluation may be hidden from the user until a threshold of participation is reached.

The technology presented herein may support applying peer pressure to increase feature adoption. For example, when a recipient has a display of mostly authenticated emails, but one email is flagged because the sender has not yet adopted the system (and hence hasn't signed their email messages), the recipient may reply to the sender with a request to adopt the system. The adoption threshold for displaying authentication (or other extended functionality) may be based on a percentage or absolute number. In an enterprise context, the threshold might be based on administrators knowing how many users have actually started using the system and have credentials. In an enterprise, the thresholding may be centrally controlled. Alternatively, on an individual basis, a particular user may have the feature controlled by how many emails in their inbox, or received in some specified time period, can be authenticated. Again such a threshold might be expressed as a proportion or as an absolute number.

The percentage or absolute number threshold may be based upon the specific recipient user's traffic, group's traffic, all traffic through a server. The percentage or absolute number threshold may also be assigned by a system administrator, or it may be user selectable. There may be multiple thresholds such as definitely bad, range of probably acceptable, risky, known bad, and so forth.

The feature may be configured to go disabled again if a second (lower) threshold is no longer exceeded. Also, there might be more than one feature controlled by different thresholds. For example, when the system is being used outside an organization, such as friends communicating with each other, another feature might be for a recipient to make an attestation (in the web of trust case) about a particular sender automatically when a certain number of incoming emails have been validated. The recipient could be prompted, for example: "You have read ten emails that appear to have come from John Doe. Are you prepared to attest to others that the public key being used belongs to johndoe@johndoemail.com?"

It should be appreciated that an email message allegedly sent from the sender 100 may be flagged as suspicious or unauthenticated when the system 100 expects the sender to be signing their email messages yet the message in question is not signed. This flagging may be performed at the sender email client module 135, the sender email server module 145, the recipient email server module 165, the recipient email client module 175, or any combination thereof.

Figure 2:
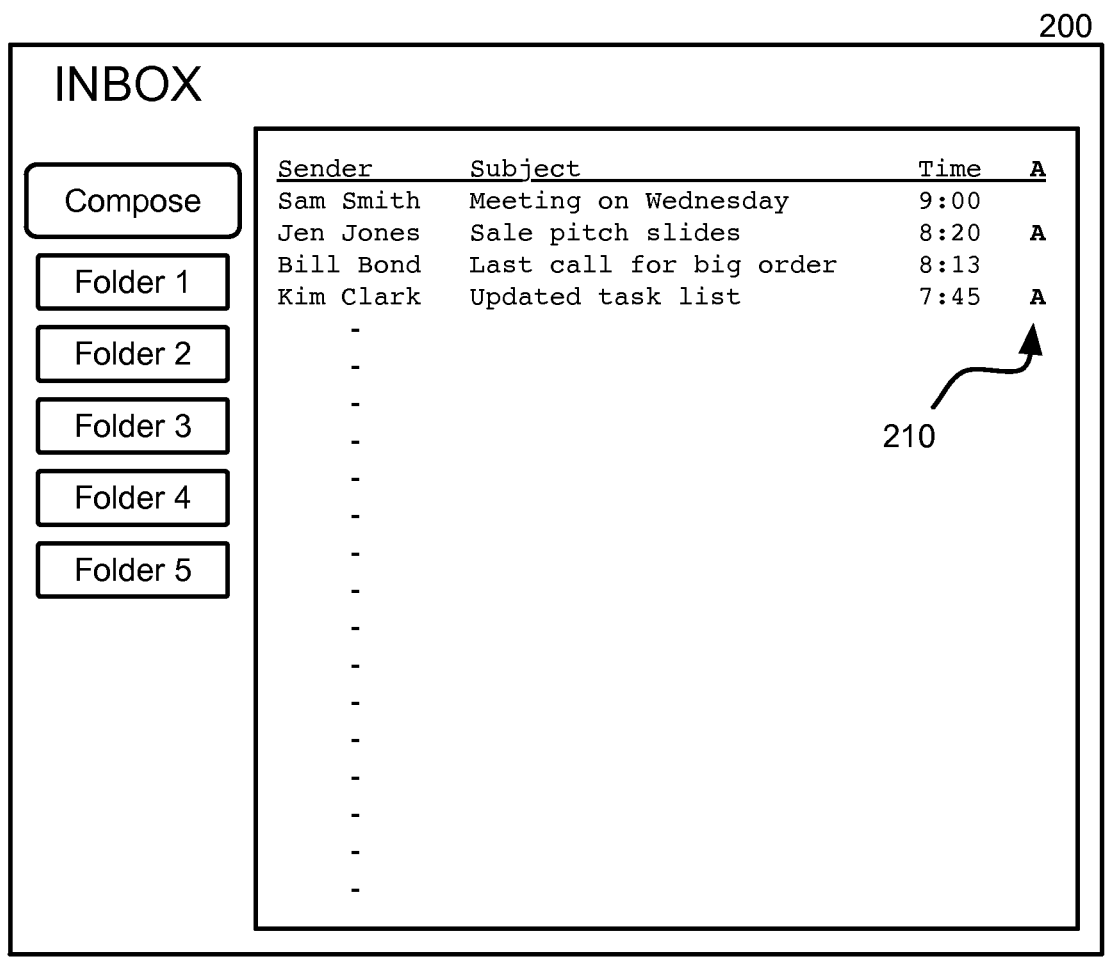
FIG. 2 is a graphical user interface diagram illustrating an electronic mail inbox incorporating an authentication indicator for each received message in accordance with one or more embodiments presented herein.

FIG. 2 is a graphical user interface diagram illustrating an electronic mail inbox 200 incorporating an authentication indicator 210 for each received message according to certain exemplary embodiments of the technology presented herein.

The inbox 200 may display functional buttons to allow the user to compose a new message and/or handle messages in various folders. Composing an email message may involve entering and transmitting a new message. Messages in folders may be replied to, forwarded, moved, saved, deleted or otherwise handled by the user. The inbox 200 may operate in association with and/or as a function of the sender email client 130. Email transmission, processing, and delivery may operate in association with the sender email client 130, sender email server 140, the recipient email server 160, the recipient email client 170, or any combination thereof.

The inbox 200 may also contain links to received messages and display metadata characteristics of the message. Metadata characteristics displayed in inbox 200 may include the name of the sender, the subject of the received message, and the time of message receipt.

Metadata characteristics displayed in the inbox 200 may also include the authentication indicator 210. The authentication indicator 210 can be an extended email feature that may indicate authenticity of the sender for any received email.

While the authentication indicator 210 is illustrated as a bold letter A, it should be appreciated that it may be some other symbolic indicator, an icon, a color, another graphical indicator, or so forth. It may be a level indicator showing a percentage of authentication confidence. Such an indicator may be like a fuel gauge, a pie chart, a bar chart, a numerical indicator, or so forth.

The authentication indicator 210 may or may not be displayed to the email recipient 120 until a threshold of use or adoption is exceeded. For example, the authentication indicator 210 may not be displayed to the email recipient 120 until the adoption of the authentication feature by other email users is widespread enough for the system to make somewhat reliable recommendations as to the authenticity and trustworthiness of received email messages. Conversely, certain dangerous situations may demand that the authentication indicator 210 be displayed to the email recipient 120 even if the threshold of use or adoption has not been exceeded. Such a dangerous situation may occur, for example, when suspicious or malicious email messages are received and flagged.

According to various embodiments, the function, control, and display of the authentication indicator 210 occurs according to participation thresholding technology which can substantially improve the efficacy and/or user experience when deploying any new email feature such as cryptographic authentication, social (web of trust) authentication, any other type of authentication, or any combination thereof.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the technology described herein.

Figure 3:
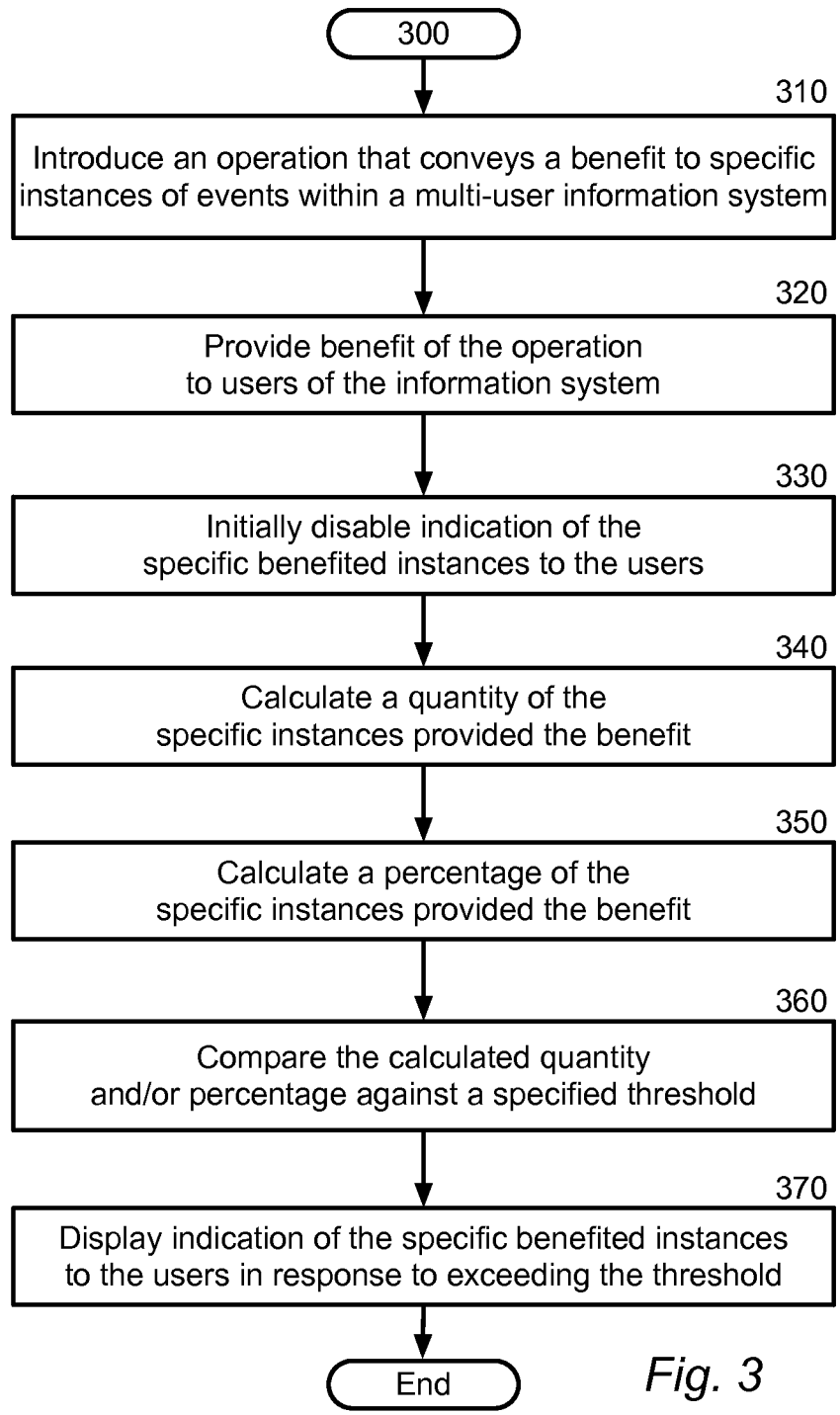
FIG. 3 is a block flow diagram depicting a method for participation thresholding of operations within a multi-user information system in accordance with one or more embodiments presented herein.

FIG. 3 is a block flow diagram depicting a method 300 for participation thresholding of operations within a multi-user information system, in accordance with certain exemplary embodiments of the technology presented herein. In block 310, an operation may be introduced that conveys a benefit to specific instances of events within a multi-user information system. The operation can relate to any type of multi-user information system such as security, email, access control, social media, crowd sourcing, mapping, reviews, e-commerce, wikis, and so forth. User benefits may include enhanced reliability of information, access to otherwise unavailable information, confidence in the authenticity and trustworthiness of other users in the multi-user system, aggregation of information from multiple users, and so forth. According to certain embodiments, the benefit associated with the newly introduced operation may be partial or statistical and thus may be displayed as such.

In block 320, benefits associated with the newly introduced operation may be provided to users of the multi-user information system. The benefits may be conveyed to the users by integration and introduction of the operation within the multi-user information system.

In block 330, indication of the specific benefited instances to the users may be initially disabled. The indication of specific benefited instances may initially be disabled in order to prevent confusion to the users or an appearance of incomplete adoption. Delaying indication of an incompletely adopted feature can support change management within a multi-user information system. Such change management can phase-in technological features when those features exhibit the network effect and thus depend upon wide adoption before becoming useful, valuable, or even meaningful to users.

In block 340, a quantity of the specific benefited instances may be calculated. The calculation may comprise a counter that may be incremented each time the newly introduced operation conveys the benefit within a multi-user information system.

In block 350, a percentage of the specific benefited instances may be calculated. A portion of the benefit counter discussed with respect to block 340 (specific benefited instances) in relation to the total quantity of instances (those benefited or not) within the multi-user information system may be computed as the percentage or ratio.

In block 360, the calculated quantity and/or percentage may be compared against a specified threshold. The threshold may be expressed as a proportion or as an absolute number and may be based on a variety of parameters including total number of system users, system usage, and so forth. The threshold may be assigned by the multi-user system administrator, or by one or more users, or in some other pre-determined manner. Alternatively, the threshold may be adaptively determined during operation of the multi-user information system. There may be multiple thresholds for multiple categories of specific benefited instances.

In block 370, indication of the specific benefited instances to the users in response to exceeding the threshold may be displayed in response to exceeding the threshold. When the quantity or percentage of specific instances of events benefited exceeds the threshold or thresholds, an indication of the benefits achieved by the participation thresholding technology may be displayed. Such display may be made available, for example, to an individual user, to a group of users, to all users, to an enterprise, and so forth.

Figure 4:
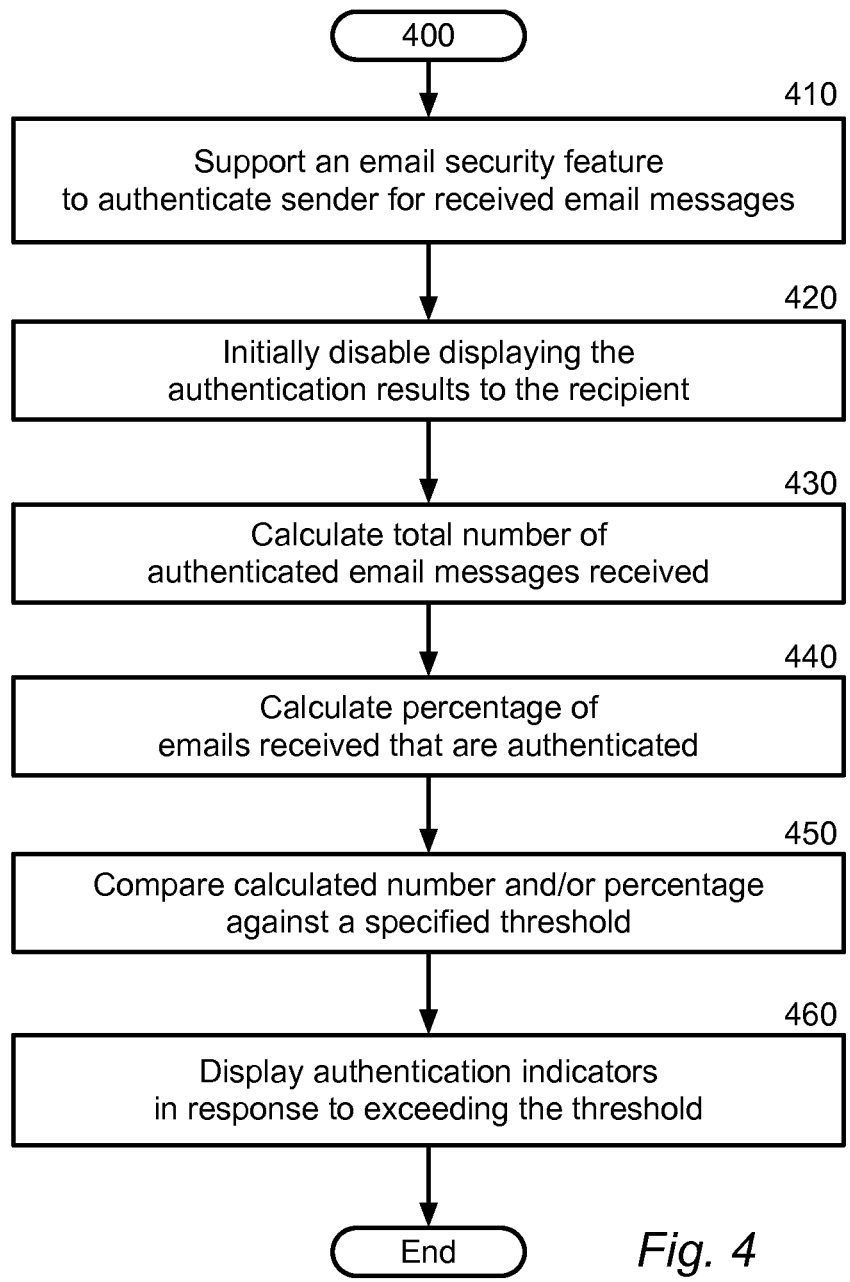
FIG. 4 is a block flow diagram depicting a method for participation thresholding of message authentication within an electronic mail system in accordance with one or more embodiments presented herein.

FIG. 4 is a block flow diagram depicting a method 400 for participation thresholding technology applied to email authentication, in accordance with certain exemplary embodiments of the technology presented herein. In block 410, an extended email feature may be supported to authenticate the sender of any email message received in the inbox 200. The extended email feature can apply to any type of email system and may, for example, provide the recipient with confidence in the authenticity and trustworthiness of messages received from other users of the email system. Other examples of the extended email feature 410 may be cryptographic authentication, social (web of trust) authentication, any other type of authentication, or any combination thereof.

In block 420, displaying the authentication results to the recipient may be initially disabled. Disabling the display of authentication results in the inbox 200 may be used to avoid frustrating or confusing the user when many of their received emails cannot be authenticated. Display of authentication status for a received email may also be disabled or suppressed until a threshold of use or adoption is exceeded. Such thresholding can allow the email system to refrain of displaying authentication conditions of particular messages until adoption within the email system is widespread enough to provide display of authentication conditions on a significant portion of received messages.

According to certain embodiments, allowing display of the authentication results to the recipient even if the threshold of use or adoption has not been exceeded may mitigate a high-risk situation. Such a situation may occur, for example, when suspicious or malicious email messages are received and flagged.

In block 430, a total number of authenticated email messages received may be calculated. The calculation in may comprise a counter that can be incremented each time the recipient 120 receives an email message at the recipient email client 170 that may be authenticated as having been sent from a particular sender 110.

In block 440, a percentage of authenticated email messages received by may be calculated. The calculation in may comprise a ratio between a count of received email message that may be authenticated as having been sent from a particular sender 110 to the total number of received email messages. Counting and comparing these two values may be provide the percentage or ratio of authenticated messages.

In block 450, the calculated number and/or percentage may be compared against a specified threshold. The threshold may be expressed as a proportion or as an absolute number and may be based on a variety of parameters including total number of email users, emails received, and so forth. The threshold may also be based upon the specific recipient user's traffic, the group's traffic, all traffic through a server, or any combination thereof. The threshold may be assigned by the email system administrator, or be user selectable by one or more users, or pre-determined in some other manner. There may be multiple thresholds for multiple categories of authenticated emails received, such as definitely bad, range of probably acceptable, risky, known bad, and so forth.

In block 460, authentication results may be displayed in response to the threshold being exceeded. When the quantity or percentage of authenticated emails received exceed the threshold or thresholds, an indication of the benefits achieved by the participation thresholding technology, such as the authentication indicator 210 in the inbox 200, may be displayed.

It should be appreciated that any of the functionality presented herein may be partitioned across multiple systems. For example, employing a client/server architecture. Alternatively, the functionality may be largely, or entirely, implemented at client level, on a server, or within services that are centralized, cloud-based, virtualized, or so forth. Where process steps are described that may be distributed across two or more subsystems, it should be appreciated that discussion of the steps may apply entirely to each subsystem through support of, or dependency upon, other sub-systems. According to certain examples, when a status indicator associated with an email message is presented to a user at an email client, it should be appreciated that an associated server may still participate in presenting the status indicator at the client by way of providing information about the status to the client or operating in expectation or reliance that the client is presenting the status. Even when not expressed through specific example, it should be understood that any functionality presented herein may be implemented within any single subsystem, partitioned across two or more subsystems, or any combination thereof without departing from the spirit of scope of the disclosure.

Example Systems

FIG. 5 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for change management thresholds within human machine interfaces, comprising:

introducing an operation into a multi-user information system for securing electronic mail messages;

conveying a benefit from the operation for securing instances of electronic mail messages within the multi-user information system;
initially suspending user notifications associated with conveying the benefit even while the benefit is being conveyed;
calculating a quantity of electronic mail messages secured by the operation;
comparing the calculated quantity to a threshold quantity of secured electronic mail messages, wherein the threshold quantity represents a ratio of secured electronic mail messages among a total number of electronic mail messages, beyond which indication of the electronic mail messages being secured is permitted to be presented to the user;
automatically allowing the initially suspended user notifications associated with the secured instances of electronic mail messages in response to the comparison indicating the threshold being exceeded; and
enabling the user notifications associated with the secured electronic mail messages prior to the comparison indicating the threshold being exceeded in order to mitigate a high-risk situation.

2. The computer-implemented method of claim 1, wherein the threshold quantity represents a count of secured electronic mail messages beyond which indication of the security benefit being conveyed is permitted to be presented to the user.

3. The computer-implemented method of claim 1, wherein the multi-user information system comprises an electronic mail system.

4. The computer-implemented method of claim 1, wherein the multi-user information system comprises one of a crowd sourced information system, an information security system, a physical security system, an access control system, an online review system, and an electronic commerce system.

5. The computer-implemented method of claim 1, wherein the operation comprises an electronic mail security feature.

6. The computer-implemented method of claim 1, wherein the operation comprises authentication of a sender associated with electronic mail.

7. The computer-implemented method of claim 1, wherein the threshold quantity is established adaptively.

8. The computer-implemented method of claim 1, wherein the threshold quantity is specified by an administrative user.

9. The computer-implemented method of claim 1, further comprising receiving a social verification, provided by the user, for authenticating the identity of a sender associated with the electronic mail messages.

10. The computer-implemented method of claim 1, further comprising communicating a trigger to other participants within the multi-user information system to adopt the introduced operation.

11. An electronic mail security system, comprising:
one or more processing units, and one or more processing modules, wherein the electronic mail security system is configured by the one or more processing modules to:
introduce a security feature into the electronic mail security system;
enable operation of the security feature within the electronic mail security system;
initially suspend indications to a user of operation of the security feature upon specific secured electronic mail even while the security feature is enabled;
calculate a quantity of the secured electronic mail;
compare the calculated quantity to a threshold quantity of secured electronic mail, wherein the threshold quantity represents a ratio of secured electronic mail among a total count of electronic mail instances, beyond which indication of the security benefit is permitted to be presented to the user;
automatically allow the initially suspend indications to the user of secured electronic mail in response to the comparison indicating that the threshold has been exceeded; and
enable indication of secured electronic mail to the user prior to the comparison indicating that the threshold has been exceeded in order to mitigate a high-risk situation.

12. The electronic mail security system of claim 11, wherein the threshold quantity represents a count of secured electronic mail beyond which indication of the security benefit will be permitted to be presented to the user.

13. The electronic mail security system of claim 11, wherein the security feature comprises authentication of a sender associated with the electronic mail.

14. The electronic mail security system of claim 11, wherein the security feature comprises cryptographic authentication.

15. The electronic mail security system of claim 11, wherein the security feature comprises social authentication.

16. The electronic mail security system of claim 11, wherein the threshold quantity is established adaptively.

17. The electronic mail security system of claim 11, wherein the threshold quantity is specified by an administrative user.

18. A computer program product, comprising:
a non-transitory computer-readable storage medium having computer-readable program code embodied therein that, when executed by one or more computing devices, perform a method comprising:
introducing an electronic message authentication feature into an electronic mail system;
providing electronic message authentication to instances of electronic mail within the electronic mail security system;
initially suspending notifications to the user of authenticated instances of electronic mail even while the authentication is being provided;
calculating a quantity of authenticated instances of electronic mail;
comparing the calculated quantity to a threshold quantity of authenticated instances of electronic mail, wherein the threshold quantity represents a ratio of authenticated instances of electronic mail among a total count of electronic mail instances, beyond which indication of the authentication is permitted to be presented to the user;
automatically allowing the initially suspended notifications to the user of authenticated instances of electronic mail in response to the comparison determining that the threshold has been exceeded; and
enabling indication of authenticated electronic mail to the user prior to the comparison indicating that the threshold has been exceeded in order to mitigate a high-risk situation.

* * * * *